No. 631,846. Patented Aug. 29, 1899.
F. COWIN.
MEAT MIXING AND KNEADING MACHINE.
(Application filed Jan. 3, 1899.)
(No Model.) 4 Sheets—Sheet 1.

WITNESSES:
Alfred Meltzer
Richard Griesser

INVENTOR
Frederick Cowin,
BY
his ATTORNEY.

No. 631,846. Patented Aug. 29, 1899.
F. COWIN.
MEAT MIXING AND KNEADING MACHINE.
(Application filed Jan. 3, 1899.)
(No Model.) 4 Sheets—Sheet 3.
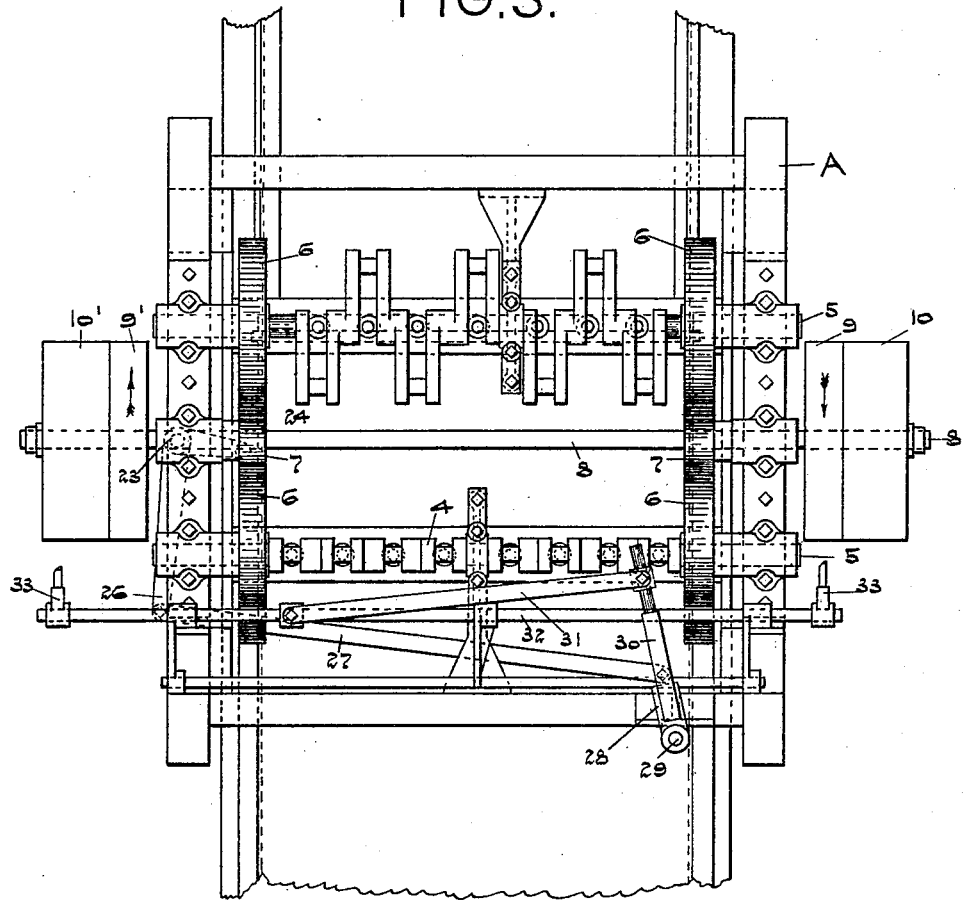
WITNESSES:
Alfred Meltzer
Richard Griesser
INVENTOR
Frederick Cowin,
BY
his ATTORNEY.

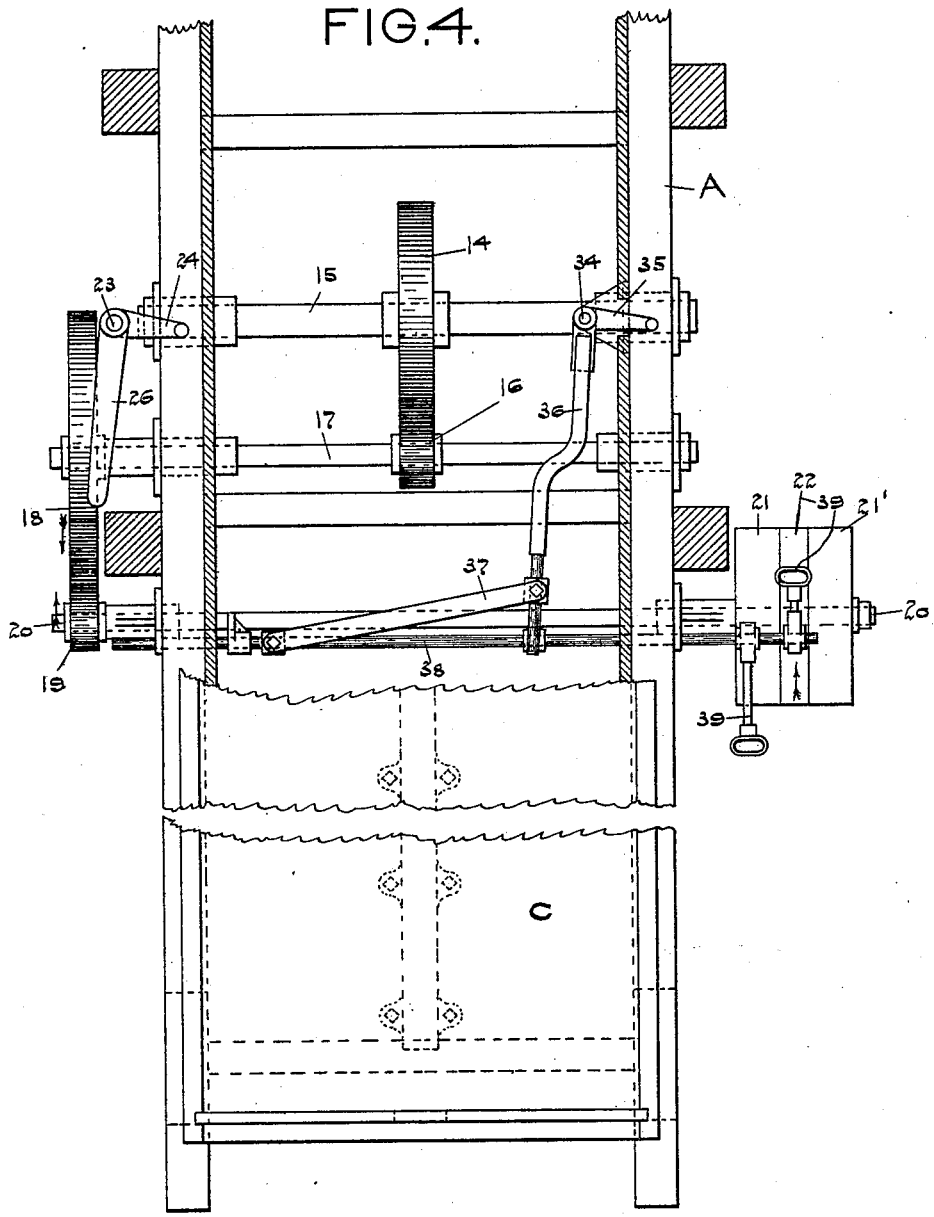

UNITED STATES PATENT OFFICE.

FREDERICK COWIN, OF CHICAGO, ILLINOIS, ASSIGNOR TO THE ANGLO-AMERICAN PROVISION COMPANY, OF SAME PLACE.

MEAT MIXING AND KNEADING MACHINE.

SPECIFICATION forming part of Letters Patent No. 631,846, dated August 29, 1899.

Application filed January 3, 1899. Serial No. 701,074. (No model.)

*To all whom it may concern:*

Be it known that I, FREDERICK COWIN, a subject of the Queen of Great Britain, and a resident of Chicago, in the county of Cook and State of Illinois, have invented certain new and useful Improvements in Meat Mixing and Kneading Machines, of which the following is a specification.

My invention relates to machines for mixing or kneading meat.

Heretofore it has been necessary to mix or knead by hand the better grades of sausage-meat. Machines have been used in mixing the cheaper grades. Such machines, however, have been made in the nature of rotary stirring apparatus, the effect of which has been to crush and shred the meat.

It is the main object of my invention to facilitate the operation of mixing the meat and rubbing in or diffusing the seasoning through same without danger of such crushing and shredding. To this end I provide a machine which is designed to imitate as nearly as possible the action of the fist of an operator.

Figure 1:
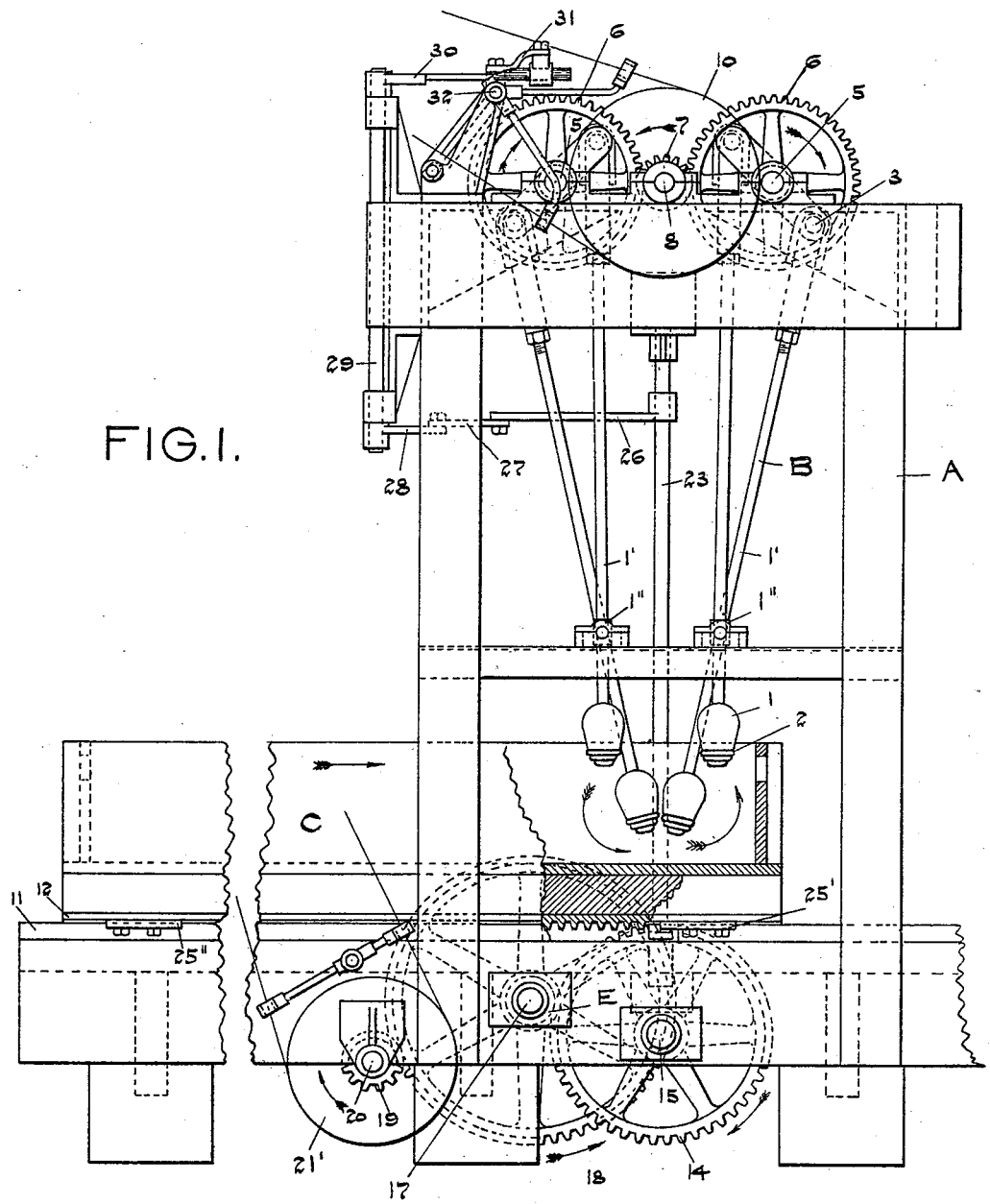
Figure 2:
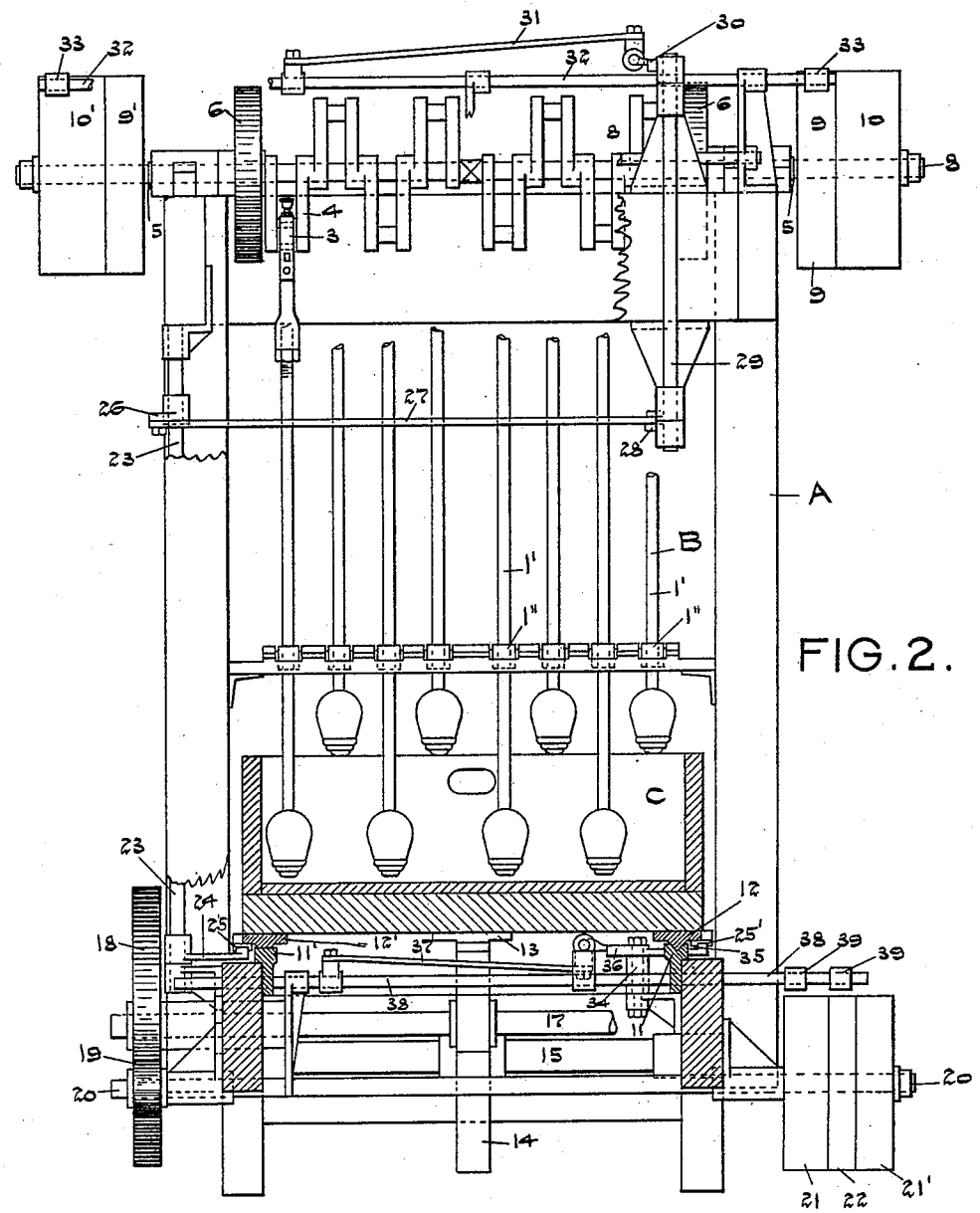

In the accompanying drawings, Figure 1 is a side elevation of a machine embodying my invention, showing part of the meat receptacle or platform in section. Fig. 2 is a front elevation of same, partly sectional. Fig. 3 is a top plan of the parts above the platform, omitting the pestles; and Fig. 4 is a top plan, partly sectional, of the parts below the platform, showing also the arms 24 and 26 on the rod 23.

The device shown consists, essentially, of the frame A, a series of pestles B, the meat receptacle or platform C, having a reciprocating travel in the path of the pestles, and the gearing for operating the pestles and platform. The pestle-heads 1 are provided with beads or ridges 2 for imitating to some extent the form of the fist of an operator.

In Fig. 1 the platform C is shown at one end of its travel and starting toward the right, as indicated by the arrow. During the travel of the platform in that direction the shafts carrying the pestles will operate in the direction of the arrow shown above same. The heads 1 of the pestles will then swing in the direction of the movement of the platform at the lower end of each stroke, as indicated by the dotted arrow-lines. The supporting-rods 1' of the pestles are slidingly guided by the sleeves 1″, pivoted to the frame. The pestles do not strike the platform, and therefore do not jam or crush the meat. Suitable gearing, hereinafter described, is provided for reversing the movement of the platform and at the same time reversing the shafts carrying the pestles. Thus when the platform is on its return movement the heads of the pestles will also swing in the direction of such movement at the lower end of each stroke.

The pestles B are pivoted at 3 to the cranks 4 of the shafts 5. The gear-wheels 6 are rigid on the shafts 5 and mesh with the pinions 7 on the shaft 8.

The shaft 8 is provided with two tight pulleys 9 and two loose pulleys 10. Each set is belted to the driving-shaft, which is not shown, the belt on one set being crossed. A belt-shifting device, hereinafter described, is provided for shifting the belt on one side upon the loose pulley, while the belt on the other side is at the same time shifted upon the tight pulley, thus providing for reversing the swing of the pestles through the shafts and gear-wheels hereinbefore described.

The platform C is slidingly supported on tracks 11 11' on the frame and tracks 12 12' on the platform and has a rack 13 meshing with the gear-wheel 14 on the shaft 15. The gear-wheel 14 meshes with the pinion 16 on the shaft 17, which carries the gear-wheel 18, meshing with the pinion 19 on the shaft 20.

The shaft 20 carries a pair of tight pulleys 21 21' and a loose pulley 22, having thereon a pair of belts, (not shown,) one of which is crossed and connects with the driving-shaft. (Not shown.) A belt-shifting device, hereinafter described, is provided for shifting these belts to reverse the travel of the platform.

The belt shifting and reversing gear may be varied; but the form shown is constructed as follows: The rod 23 is journaled in the frame and has an arm 24 rigid on its lower end, which projects in proper position to have contact with one of the projections 25 on the platform when the platform is near either end of its travel. The arm 26 is rigid on arm 23 and pivoted to the arm 27, which is pivoted to the arm 28. The arm 28 is rigid on the shaft 29, which is journaled in the frame and carries the rigid arm 30, pivoted to the arm 31, which is pivoted to the rod 32. The rod 32 is slidingly supported on the frame and carries the belt-shifters 33, (not fully shown,) which are of the form shown in Fig. 4. As will be seen, when the platform C reaches the other end of its travel the projection 25 at that end will strike the arm 24, swinging same toward the right in Fig. 1, or in the direction of the top of Fig. 3 and through the shaft 23, and parts 26 to 33, hereinbefore described, will shift the belts, respectively, to the tight pulley 9' and the loose pulley 10, thus through the connecting gearing reversing the direction of the shafts 5.

The gear for shifting the lower belts on the pulleys 21, 22, and 21' and reversing the direction of the platform C consists of a shaft or pivot 34, journaled in the frame, having thereon the rigid arms 35 and 36, the arm 37, pivoted to the arm 36 and to the rod 38, carrying the belt-shifters 39. The rod 38 is slidingly mounted in the frame. A projection 25' is provided at each end of the platform. When the platform reaches the end of its travel toward the right in Fig. 1, the projection 25' at the left end of the platform will strike the arm 35 and through the shaft 34 and parts 36 to 39 will shift the belts, so as to drive the pulley 22 in the opposite direction to that shown by the arrow, and through the connecting-gearing will reverse the direction of the gear-wheel 14, and thus carry the platform on its return course.

My invention consists, mainly, in the substitution of suitable reciprocating pestles for the rotary stirring apparatus used heretofore.

The particular mechanism for giving the pestles and the platform the desired movement, it will be understood, can be varied in numerous well-known ways without departing from the spirit of my invention. I therefore do not confine myself to the details of the operating mechanism shown.

What I claim as my invention, and desire to secure by Letters Patent, is—

1. In a meat-mixer, the combination of a supporting-frame; a platform or receptacle for supporting meat; a mixing device comprising a series of pestles having a longitudinal reciprocating movement, free from contact with said platform, and a lateral movement in proximity to said platform; mechanism for imparting such movement to said pestles; and mechanism for moving the platform in the direction of and simultaneously with said lateral movement of the pestles.

2. In a meat-mixer, the combination of a supporting-frame; a platform or receptacle for supporting meat; a mixing device comprising a series of pestles having a longitudinal reciprocating movement, free from contact with said platform, and a lateral movement in proximity to said platform; mechanism for imparting such movement to said pestles; mechanism for moving the platform in the direction of, and simultaneously with said lateral movement of the pestles; and mechanism for reversing the direction of the lateral movement of the pestles and moving the platform in such reversed direction.

3. In a meat-mixer, the combination of a supporting-frame; a platform or receptacle for supporting meat; a mixing device comprising a series of pestles having a longitudinal reciprocating movement, free from contact with said platform, and a lateral movement in proximity to said platform; mechanism for imparting such movement to said pestles; and mechanism for moving the platform in the direction of and simultaneously with said lateral movement of the pestles; said pestles each having a beaded or ridged head at its free end.

4. In a meat-mixer, the combination of a supporting-frame; a platform or receptacle for supporting meat; a mixing device comprising a series of pestles having a longitudinal reciprocating movement, free from contact with said platform, and a lateral movement in proximity to said platform; mechanism for imparting such movement to said pestles; mechanism for moving the platform in the direction of, and simultaneously with said lateral movement of the pestles; and mechanism for reversing the direction of the lateral movement of the pestles and moving the platform in such reversed direction; said pestles each having a beaded or ridged head at its free end.

Signed by me at Chicago, Illinois, this 16th day of December, 1898.

FREDERICK COWIN.

Witnesses:
ELAM CONVERSE,
BENJAMIN ROBERT IRVING.